United States Patent [19]

Armbrust et al.

[11] Patent Number: 5,436,971
[45] Date of Patent: Jul. 25, 1995

[54] METHOD OF AND CIRCUIT ARRANGEMENT FOR CHECKING A SMART CARD

[75] Inventors: Dirk Armbrust, Hamburg; Holger Brechtel, St. Peter-Ording; Volker Timm, Pinneberg, all of Germany

[73] Assignee: U.S. Philips Corporation, New York, N.Y.

[21] Appl. No.: 345,914

[22] Filed: Nov. 28, 1994

Related U.S. Application Data

[63] Continuation of Ser. No. 76,045, Jun. 15, 1993, abandoned.

Foreign Application Priority Data

[30] Jun. 17, 1992 [DE] Germany .................. 42 19 739.2
[51] Int. Cl.6 ............................................ H04K 1/00
[52] U.S. Cl. ........................................ 380/23; 380/25; 235/379; 235/380
[58] Field of Search ............................ 380/23, 24, 25; 235/379, 380; 340/825.34

[56] References Cited

U.S. PATENT DOCUMENTS

| | | | |
|---|---|---|---|
| 4,536,647 | 8/1985 | Attalla et al. | 235/379 |
| 4,697,072 | 9/1987 | Kawana | 235/380 |
| 4,746,788 | 5/1988 | Kawana | 235/380 |
| 4,977,595 | 12/1990 | Ohta et al. | 380/24 |
| 5,224,162 | 6/1993 | Okamoto et al. | 380/24 |
| 5,231,666 | 7/1993 | Matyas | 380/25 |
| 5,247,578 | 9/1993 | Pailles et al. | 380/24 |
| 5,305,383 | 4/1994 | Guillou et al. | 380/24 |

*Primary Examiner*—Tod R. Swann
*Attorney, Agent, or Firm*—Michael J. Balconi-Lamica; Laurie E. Gathman

[57] ABSTRACT

Prepaid smart cards which serve to procure services, for example from a public telephone, comprise a memory for value units which are debited in conformity with the service procured, i.e. are marked as having been consumed. The smart card comprises a test code circuit which generates reply data from a supplied test word in conformity with a secret algorithm. Upon use of the smart card it is thus checked whether a valid smart card is concerned. Fraud could be attempted by using a valid smart card and a test code circuit present therein in combination with a separate, manipulatable memory. In order to prevent this, the algorithm of the test code circuit is modified in dependence on the contents of the memory of the valid smart card, the smart card being checked by means of the test code circuit at least after the debiting of value units. Fraudulent use of an external memory is thus no longer possible.

15 Claims, 1 Drawing Sheet

METHOD OF AND CIRCUIT ARRANGEMENT FOR CHECKING A SMART CARD

This is a continuation of application Ser. No. 08/076,045, filed Jun. 15, 1993, now abandoned.

BACKGROUND OF THE INVENTION

The invention relates to a method of checking a smart card having an integrated circuit with a memory for value units and a test code circuit. A terminal station whereto the smart card is electrically connected transmits a test word to the smart card and the test code circuit generates, from the test word, reply data in conformity with a secret algorithm. The reply data is transmitted to the station in which it is compared with reply data generated from the test word in conformity with the same algorithm.

The invention also relates to a circuit arrangement for checking a smart card having an integrated circuit with a memory for value units, a test code circuit, and means for connecting the integrated circuit to a terminal station. The test code circuit generates reply data from a test word received from the station, in conformity with a secret algorithm stored in the test code circuit. The reply data is applied to the station. The invention also relates to a smart card and a terminal station arranged for use in such circuit arrangement and/or in such method.

Smart cards of this kind are already being used in a variety of applications in order to acquire services or goods, an appropriate number of value units in the memory being marked as having been consumed by the station before the service is rendered. A known application in this respect is a telephone card in which, during a call, value units are continuously marked as having been consumed along with the duration of the call.

A smart card, usually purchased from the firm offering the service represents a given value. Therefore, frauds are tempted to make counterfeit or falsified smart cards for which the fraud does not pay the firm offering the service. In order to preclude or at least substantially impede such fraud, the integrated circuit including the memory also includes a test code circuit which generates, in conformity with a secret algorithm, reply data from a test word transmitted by the station and applies this reply data to the station. Because this algorithm is hidden in the integrated circuit, either by wiring or by way of stored data or both, it is practically impossible to discover and simulate this algorithm. The test word is preferably a random number, so that in the case of repeated use of a valid smart card each time different reply data is returned; when the secret algorithm is chosen to be sufficiently complex, it will be impossible or virtually impossible to deduce it from evaluation of different test words and associated reply data for the purpose of fraud.

However, it is possible to use a valid smart card and to connect a multiplexer between the means for connection to the station, for example between the contact pads in the case of a conductive connection and the memory with the test code circuit. The multiplexer establishes the connection with the valid smart card during the checking of the smart card by means of the test word but switches over to a counterfeit memory for value units during the marking of value units. The counterfeit memory can be manipulated, notably erased, from the outside so that in this manner an "eternal" smart card is obtained whereby arbitrary services can be obtained without payment.

SUMMARY TO THE INVENTION

Therefore, it is an object of the invention to provide a method of checking a smart card of the kind set forth which offers increased protection against attempted fraud.

This object is achieved in accordance with the invention in that prior to the transmission of the test word the station determines a representative content of the memory for the value units. The test code circuit then generates the reply data in dependence on the representative content of the memory. After marking value units in the memory the station transmits a test word and compares the reply data.

Thus, in accordance with the invention the memory for the value units itself is involved in generating the reply data from the test word. Because the memory and the test code circuit are integrated together on a single semiconductor substrate, it is practically impossible to connect a counterfeit, external memory to the relevant input of the test code circuit. It is inevitable that value units to be debited, i.e. to be marked, are indeed marked in the memory associated with the valid smart card with the appropriate test code circuit. Fraudulent switching over to a counterfeit memory is thus substantially precluded.

Valid smart cards of the known type can in principle be connected to an imitation of a station, for example to a computer, and a large number of different test words can be applied thereto so as to analyze the reply data and derive the secret algorithm therefrom. In order to preclude this possibility, in a further version of the invention the station transmits a test word only after having marked value units. As a result, with each valid smart card only a limited number of attempts to find the secret algorithm are possible, after which the smart card is useless so that these attempts are expensive and hence not worthwhile. The fact that first the smart card is debited without checking its validity is not a drawback in practice.

The generating of reply data from the test word in dependence the data regarding the content of the memory can be executed in various different ways. A very elementary method takes the data as a parameter value for the algorithm. A very attractive method is that in the test code circuit the reply data is generated according to one of a plurality of different algorithms that is selected in dependence of said representative content. Through the transition between different algorithms the ascertaining of a particular one thereamongst is rendered even more difficult.

It is a further object of the invention to provide a circuit arrangement for checking a smart card of the kind set forth which offers increased protection against fraudulent manipulations.

This object is achieved in accordance with the invention in that the test code circuit is coupled to the memory and receives data concerning the contents of the memory and, in dependence on said data, generating the reply data. When such smart cards are used it is practically impossible to procure unpaid services by means of an additional manipulatable memory.

Various further advantageous aspects of the invention are recited in dependent and independent claims.

BRIEF DESCRIPTION OF THE FIGURES

Various aspects and advantages of the invention will be described hereinafter in detail with reference to the drawing. Therein.

DETAILED DESCRIPTION OF A PREFERRED EMBODIMENT

For the following description of embodiments it is assumed that the smart card concerns a card for a public telephone, the station being formed by the telephone apparatus. However, it will be evident that the description in principle holds also for other types of smart cards.

Figure 1:
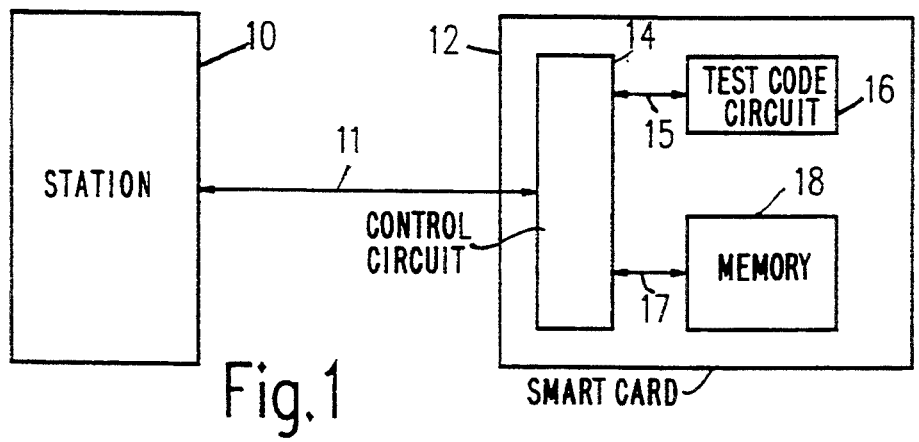
FIG. 1 shows a block diagram of a smart card in connection with a station.

In FIG. 1 a smart card 12 is connected, via a connection 11 for transmitting electric signals, to a station 10. The connection 11 included a plurality of parallel leads via which serial data, a clock signal and a reset signal are transmitted in addition to the supply voltage for the smart card 12. In principle, however, the connection 11 can also be realized in a different manner, for example as an inductive coupling via one or more pairs of coils.

The smart card 12 comprises a control circuit 14 which, for example regenerates, amplifies and preprocesses signals, as well as a test code circuit 16 which is connected to the control circuit 14 via the connection 15, and a memory 18 for value units which is connected to the control circuit 14 via the connection 17. If necessary, the connections 15 and 17 may also include of a plurality of parallel leads.

When a telephone call is to be made in the present example, the smart card 12 is inserted into an appropriate aperture of the telephone apparatus 10 so that the connection 11 is established. The telephone apparatus 10 first transmits a test word which is applied from the control circuit 14 to the test code circuit 16. The test code circuit processes the test word in conformity with a secret algorithm permanently stored therein and generates reply data which is applied, via the connection 15 and the control circuit 14, to the telephone apparatus 10 in which it is compared with reply data generated from the same test word by means of the same algorithm as that used in the test code circuit 16 of the smart card 12. If no correspondence is detected, the entire operation is immediately interrupted, because it is assumed that an unvalid or counterfeit smart card is concerned so that no telephone call can be made.

However, if the comparison of the reply data leads to correspondence, subsequently the telephone apparatus 10 issues, via the connection 11, an instruction which marks, via the control circuit 14 and the connection 17, a value unit not yet consumed as having been consumed in the memory 18. The memory 18 contains, for example a storage cell for each value unit and the control circuit 14 addresses the memory 18, via the connection 17, in a predetermined sequence until the first storage cell containing a valid value unit is encountered. As soon as this value unit has been consumed by the duration of the telephone call, the telephone apparatus again applies an instruction to the smart card 12 and a further value unit is marked having been consumed, etc.

Evidently, before the marking of the first value unit, the telephone apparatus 10 should interrogate the contents of the memory 18, for example to establish how many value units have not yet been consumed, so that at the most this number of value units will subsequently be marked and the call will be interrupted when its duration continues. A further possibility is in that the control circuit 14 applies an appropriate signal to the telephone apparatus 10 when the last value unit has already been marked. In each case it is then impossible to start another telephone call by means of a card whose value units have all been marked.

Figure 2:
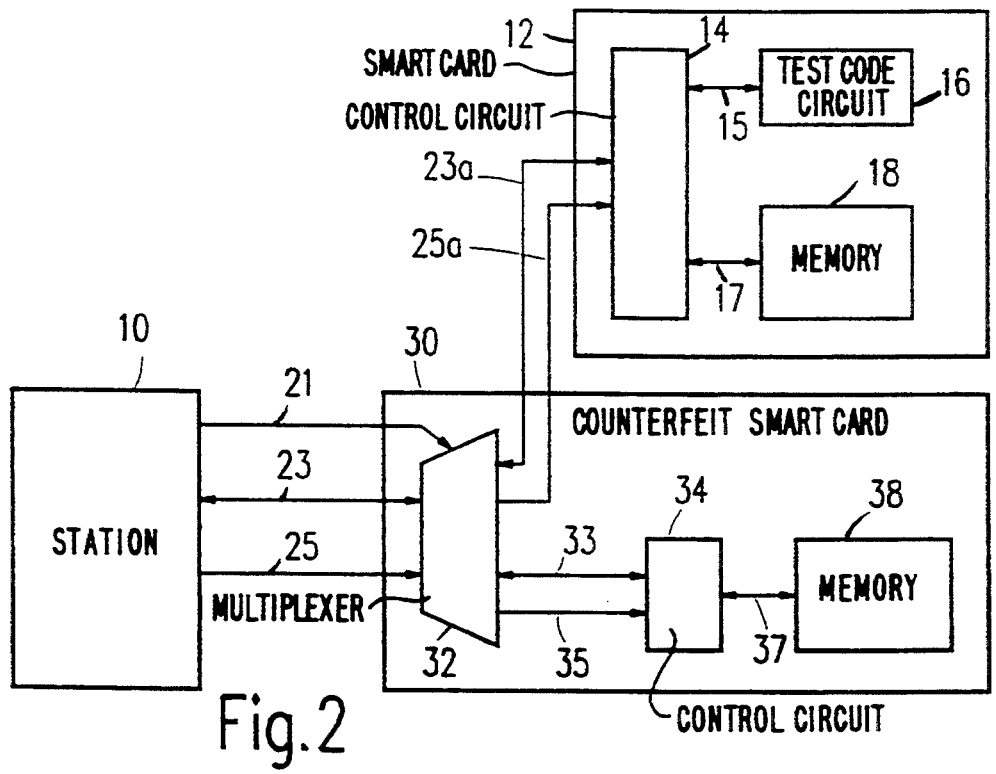
FIG. 2 shows the block diagram of a fraudulent device comprising a counterfeit memory.

FIG. 2 shows a block diagram of a device enabling an external, manipulatable memory 18 to be substituted for the memory 18 of the smart card 12. For this purpose use is made of a counterfeit smart card 30 which comprises a multiplexer 32 which connects the connections 23 for the data transmission and 25 for the clock signal selectively to the connections 23a and 25a which lead to a valid smart card 12, or the connections 23 and 25 are coupled to connections 33 and 35 of the counterfeit card 30 which lead to a control circuit 34 which is coupled to a memory 38 via a connection 37. The control circuit 34 comprises essentially all elements of the control circuit 14 which are required for controlling the memory 38, i.e. for reading and writing the memory 38. The multiplexer 32 is switched over by a reset signal on the lead 21, it being possible for this signal to be applied also to the elements of the counterfeit smart card and the valid smart card 12. This is because the reset signal on the lead 21 appears when a test word is transmitted and the reply data awaited by the telephone apparatus 10.

In this state the multiplexer 32 switches over to the upper connections 23a and 25a, so that the valid smart card 12 is coupled to the telephone apparatus 10. The secret algorithm in the test code circuit 16 then forms the correct reply data for supply to the telephone apparatus 10. The apparatus recognizes a valid smart card and subsequently transmits the first instruction to mark a value unit. The multiplexer 32 is then switched to the other position, i.e. the counterfeit memory 38 is then connected to the telephone apparatus 10. This memory 38 can be erased, for example prior to each use, i.e. all memory cells contain valid value units, so that an arbitrary number of telephone calls can be made by means of the device shown in FIG. 2. The maximum length of an individual telephone call is limited by the capacity of the memory 38, but this capacity can be chosen to be equal to the maximum number of value units in valid smart cards.

Figure 3:
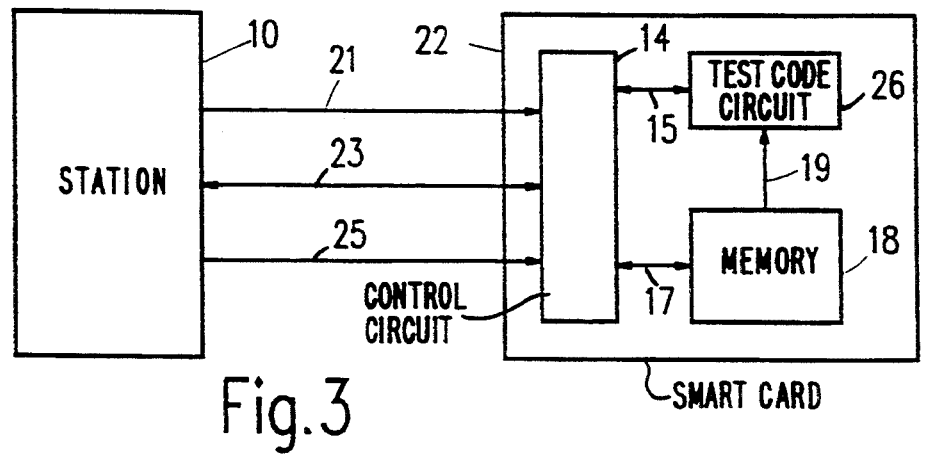
FIG. 3 shows a smart card in accordance with the invention in connection with a terminal station.

The described fraud is precluded in the device shown in FIG. 3. The construction of the smart card 22 is essentially the same as that of the smart card 12 of FIG. 1; only the test code circuit 26 of FIG. 3 deviates from the test code circuit 16 of FIG. 1. The difference consists in that the test code circuit 26 receives, in addition to the test word via the connection 15, data concerning the essential contents of the memory 18 via the connection 19. This data contains notably an indication as to how many value units are still valid in the memory 18 or how many value units are marked as having been consumed already. In dependence on this data concerning the contents of the memory 18, the test code circuit 26 generates different reply data for the same test word supplied, for example in that an extended test word is generated by supplementing the original test word with the data regarding the content of the memory, whereupon the reply data is generated according to a particular algorithm or in that the data supplied via the connection 19 switches over the algorithm whereby the reply data is formed from a test word or in that this data from the memory 18 select one of several algorithms in the test code circuit 26.

In order to enable correct evaluation of the reply data returned by the test code circuit 26, via the connection 15, the control circuit 14 and the data connection 23, in the telephone apparatus 10, before the reception of the reply data, i.e. preferably before the transmission of the test word, the contents of the memory 18 should be interrogated by the telephone apparatus 10 which applies an appropriate command, via the data connection 23, to the control circuit 14 which evaluates the contents of the data memory 18 via the connection 17. On the basis of this information concerning the contents of the memory 18, the telephone apparatus 10 can form, from the test word transmitted, the reply data which is also awaited from a valid smart card 22 on the basis of the transmitted test word.

A further possibility is in that, after the insertion of the smart card, the station first reads the contents of the memory thereof without checking, subsequently marks an unused value unit in the memory, checks it, possibly by renewed reading of the memory, and transmits a test word only after that. As soon as the reply data generated therefrom is recognized as being correct in the station, the telephone connection is established; otherwise the connection is interrupted or the use of the telephone apparatus is prevented. Such an execution of the steps, imposed by an appropriate construction of the control circuit of the smart card, can be possible to prevent or make it even more difficult to discover the secret algorithm by means of a large number of attempts via a computer. This is because it is possible to connect the valid smart card to an imitation of a station, i.e. to a computer, and to supply it with a large number of different test words, the reply data derived therefrom being analyzed. However, when the reply data is returned only after debiting of a value unit in the described manner, the number of attempts by means of a smart card is limited by the number of value units in its memory; the smart card will be consumed by the attempts, so that this method of discovering the secret algorithm is very expensive.

In any case it is necessary to use the memory 18 of the valid smart card 22. This is because when use is made of a counterfeit smart card, such as the smart card 30 of FIG. 2, the telephone apparatus 10 would calculate the reply data on the basis of the interrogated contents of the memory 38, which data then deviates from the reply data that would be generated by the test code circuit 16 on the basis of the contents of the memory 18. However, even when the multiplexer 32 is switched over so that upon interrogation of the memory contents by the telephone apparatus 10 each time switching over to the correct smart card 12 takes place, fraudulent manipulation will be discovered no later than after the marking of the first value unit, because in the case of fraud the contents of the memory 18 remain unchanged, whereas for the determination of the reply data the telephone apparatus 10 assumes a contents of the memory 18 which has been modified by one value unit.

Because the elements included in the smart card 22 in the device shown in FIG. 3 are integrated on a semiconductor chip, on the other hand it is practically impossible to connect the connection 19 to the test code circuit 26 instead to an output of the counterfeit memory 38. Fraudulent use of a counterfeit memory, therefore, is no longer possible.

We claim:

1. A method of checking a smart card including a memory for value units and a test code circuit integrally coupled to the memory, the method comprising the steps of:
    marking a portion of the value units;
    determining, by a station electrically connected to the smart card, a representative content of the memory which representative content is indicative of those value units not yet marked;
    generating in the station, a test word to be transmitted to the smart card;
    generating expected reply data in dependence upon the test word and the representative content of the memory;
    transmitting the test word to the smart card;
    generating, in the test code circuit, reply data in conformity with a secret algorithm and dependent upon the representative content of the memory;
    transmitting the reply data to the station; and
    comparing, in the station, the reply data generated by the test code circuit with the expected reply data generated by the station.

2. A method as claimed in claim 1, wherein the step of transmitting the test word only occurs after the step of marking.

3. A method as claimed in claim 1, wherein the representative content of the memory is indicative of those value units marked.

4. A method as claimed in claim 1, wherein the test code circuit includes a plurality of different algorithms and the method further includes the step of selecting one of the algorithms in dependence on the representative content of the memory, and the step of generating the reply data is performed according to the selected algorithm.

5. A method as claimed in claim 3, wherein the test code circuit includes a plurality of different algorithms and the method further includes the step of selecting one of the algorithms in dependence on the representative content of the memory, and the step of generating the reply data is performed according to the selected algorithm.

6. A circuit arrangement for checking a smart card having means for connecting to a station which station includes means for generating a test word, the circuit arrangement comprising in an integrated circuit:
    a memory for storing data representing value units; and
    a test code circuit coupled to the memory and including (i) storing means for storing an algorithm, (ii) receiving means for receiving the memory data, (iii) reply data generating means for generating reply data in dependence upon the test word, the memory data and in conformity with the algorithm, and iv)transmitting means for transmitting the reply data to the station.

7. A circuit arrangement as claimed in claim 6, wherein the test code circuit includes means for storing a plurality of algorithms and means for selectively switching to one of the algorithms in dependence upon the memory data.

8. A circuit arrangement as claimed in claim 6, wherein the circuit arrangement is included on the smart card.

9. A terminal station for electrically connecting to a smart card having in an integrated circuit i) a memory for storing data representing value units, ii) means for connecting to the terminal station, iii) marking means for marking the value units, and iii) a test code circuit including, storing means for storing an algorithm, and reply data generating means for generating reply data in conformity with the algorithm, the terminal station comprising:

means for transmitting a test word to the smart card for use by the reply data generating means;
 means for receiving the reply data from the test code circuit, which reply data is dependent upon the test word;
 means for receiving the memory data;
 means for storing the algorithm;
 means for generating expected reply data dependent upon the marked value units, the test word and in conformity with the algorithm; and
 comparing means for comparing the reply data to the expected reply data.

10. A terminal station as claimed in claim 9, wherein the test code circuit includes a plurality of algorithms and the means for storing includes means for storing the plurality of algorithms and means for selecting a particular algorithm which is dependent upon the memory data.

11. A terminal station as claimed in claim 9, wherein the generating means is dependent upon the unmarked value units instead of the marked value units.

12. A method of checking a smart card including a memory for value units and a test code circuit in a single integrated circuit, the method comprising the steps of:

determining, by a station electrically connected to the smart card, a representative content of the memory which representative content is indicative of those value units not yet marked;
 generating in the station, expected reply data in dependence upon a test word to be transmitted to the smart card and the representative content of the memory;
 transmitting, to the smart card, the test word;
 generating, in the test code circuit, reply data in conformity with a secret algorithm and dependent upon the representative content of the memory;
 transmitting the reply data to the station; and
 comparing, in the station, the reply data generated by the test code circuit with the expected reply data generated by the station.

13. A method of checking a smart card as claimed in claim 12, further including the steps of:

marking the value units before the test word is transmitted; and
 comparing the number of unmarked value units after the step marking to the number of unmarked value units before the step of marking.

14. A method of checking a smart card as claimed in claim 13, wherein the step of comparing compares the number of marked value units after marking to the number of marked value units before marking.

15. A terminal station for electrically connecting to a smart card having in an integrated circuit i) a memory for storing data representing value units, ii) means for connecting to the terminal station, and iii) a test code circuit including, storing means for storing an algorithm, and reply data generating means for generating reply data in conformity with the algorithm, the terminal station comprising:

means for transmitting a test word to the smart card for use by the reply data generating means;
 means for receiving the reply data from the test code circuit, which reply data is dependent upon the test word;
 means for receiving the memory data;
 means for storing the algorithm;
 means for generating expected reply data dependent upon the memory data, the test word and in conformity with the algorithm; and
 comparing means for comparing the reply data to the expected reply data.

* * * * *